March 20, 1973   C. A. LEWIS ET AL   3,721,190
ANTIMINE PISTOL
Filed June 7, 1961   4 Sheets-Sheet 1
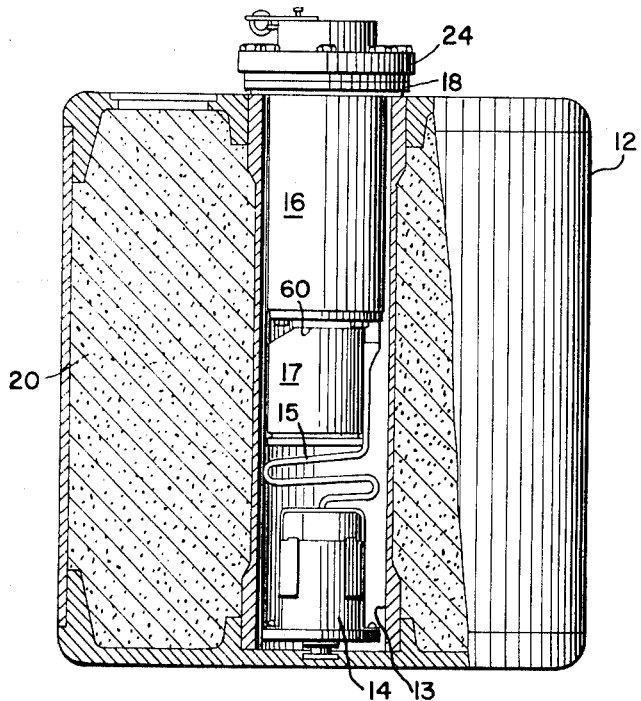
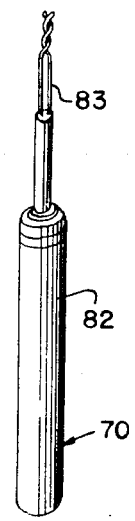
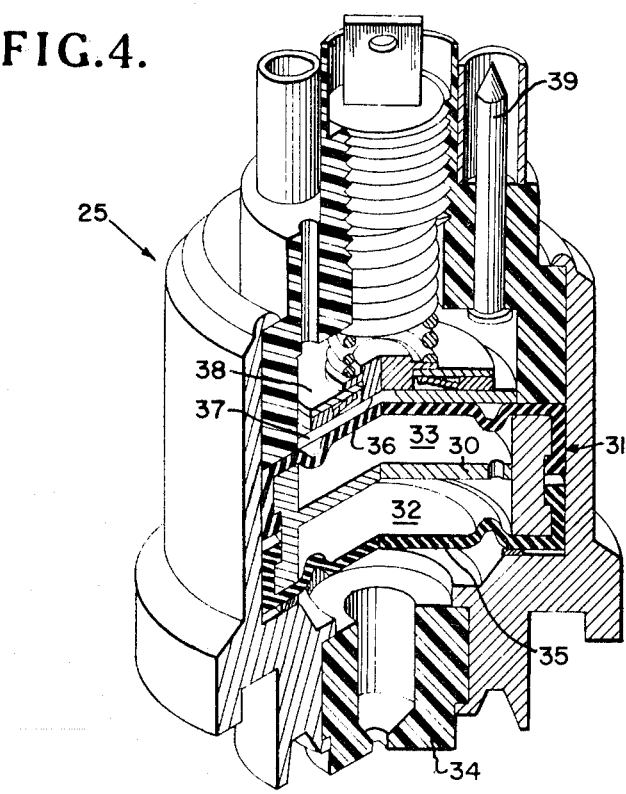
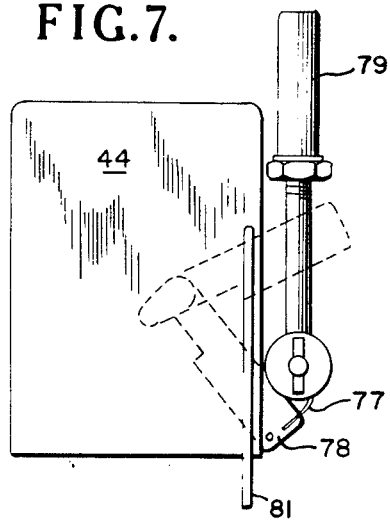
INVENTORS.
C. A. LEWIS, J. HOMZA,
E. A. VOLKMER, G. P. KALAF,
C. D. CODDINGTON, C. J. ZABLOCKI
ATTYS.

March 20, 1973     C. A. LEWIS ET AL     3,721,190
ANTIMINE PISTOL

Filed June 7, 1961     4 Sheets-Sheet 3

INVENTORS.
C. A. LEWIS
J. HOMZA
E. A. VOLKMER
G. P. KALAF
C. D. CODDINGTON
C. J. ZABLOKI

ATTYS.

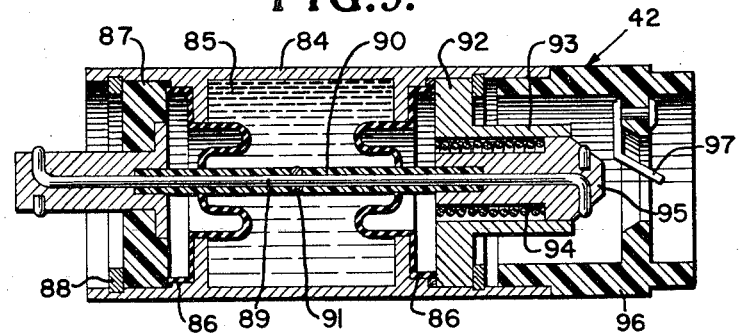
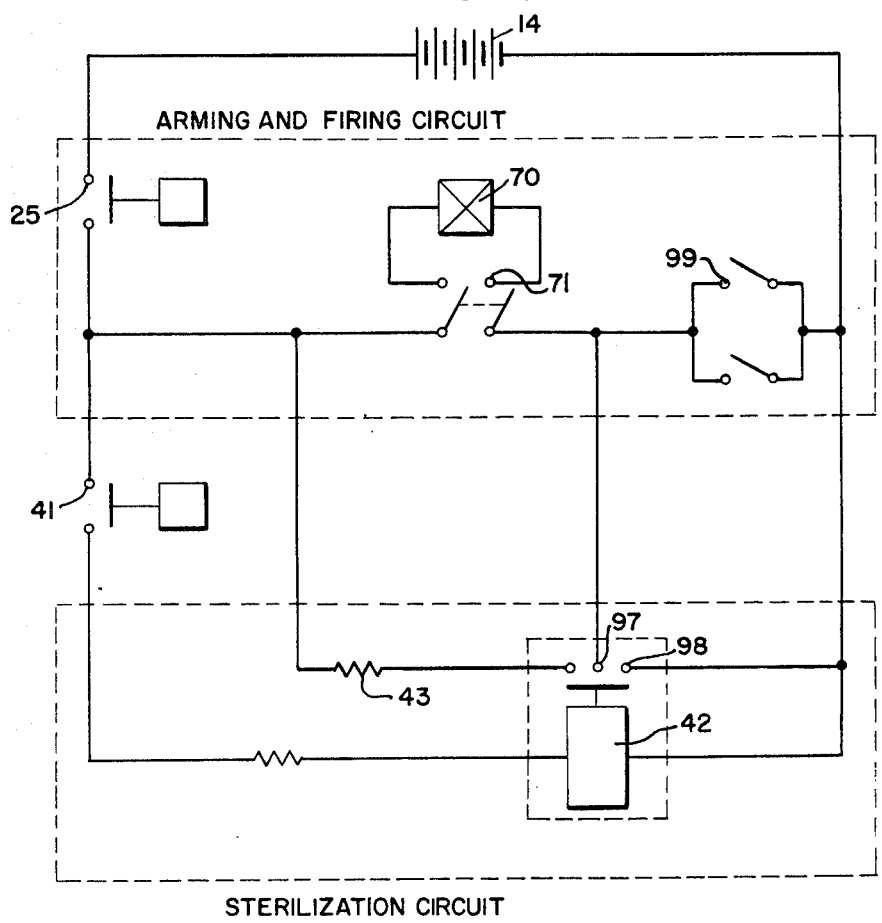

United States Patent Office 3,721,190
Patented Mar. 20, 1973

3,721,190
ANTIMINE PISTOL
Charles A. Lewis, Silver Spring, John Homza, Lanham, Eldon A. Volkmer, Takoma Park, and George P. Kalaf, Rockville, Md., Carl D. Coddington, Washington, D.C., and Charles J. Zablocki, Glendore, Calif., assignors to the United States of America as represented by the Secretary of the Navy
Filed June 7, 1961, Ser. No. 126,391
Int. Cl. F42b 21/34, 5/08
U.S. Cl. 102—16
21 Claims The invention described herein may be manufactured and used by or for the Government of the United States of America for governmental purposes without the payment of any royalties thereon or therefor.

This invention relates to an antimine pistol suitable for use with an explosive destructor which is used in a weapon system for the destruction of a bottom mine.

Bottom mines which during war times are placed in harbors can be a hazard during peace times and the most effective and economical method of removing them is to explode them. One method of accomplishing this is to explode another charge in the close vicinity of the bottom mine. The procedure for finding and destroying the bottom mines is generally dependent on local equipment and conditions under which the search and destruction must be carried out. The method which employs the present invention utilizes a sonar equipped mine hunting ship which searches the area believed to contain bottom mines and upon locating a target by sonar, directs a helicopter to the location. The helicopter towing a destructor carrier underwater locates the mine by means of a television camera carried by the destructor carrier and deposits the destructor as close as possible to the bottom mine. The destructor is exploded by means of the pistol forming the subject of this invention.

An object of the present invention is to provide a pistol which is attached to a destructor, generally a container of explosives, and which will, under desired conditions, such as immersion in water to a depth of at least ten feet, arm, fire and where there is a dud or a non-fire destructor, sterilize the pistol after an elapsed time period.

Another object is to provide a combination of hydrostatic switches, mechanical clock-like mechanism and an electrical sterilizer to initially arm the pistol, start the cycle of the escapement mechanism, fire a detonator and upon failure of the detonator to fire, discharge a battery to prevent subsequent possibility of firing.

Generally, the arming of the pistol after release from the carrier follows as a result of the closure of several switches and the operation of a mechanical linkage. This linkage rotates a detonator gun assembly 180° to align the detonator with a booster which when ignited fires the main explosive charge carried by the destructor.

When the explosive destructor reaches a depth of between ten and fifteen feet a hydrostatically operated switch closes and after withdrawal of an arming wire and release of the destructor from the carrier the arming delay after a time interval closes a second switch. At this time a sterilizing circuit is initiated and a clock delay mechanism is started. The clock delay mechanism eventually closes a pair of firing switches. The mechanical linkage simultaneously with the closing of the second switch aligns the detonator gun assembly with the booster and the pistol is fully armed.

The firing takes place when the clock-delay mechanism closes either of its two switches which may be from nine to thirty minutes after the clock delay mechanism is started. A battery carried by the destructor is placed in series with the detonator which blows through a weakened area of the pistol and ignites the booster which is flush against this weakened area. The exploding of the booster fires the destructor which explodes the bottom mine.

The sterilization device, built into the pistol, renders the explosive ineffective should the detonator fail to fire within the nine-thirty minute period. The sterilizing device is designed to operate between one to two hours after the release of the destructor from the carrier. A switch closes a circuit from the battery to the detonator and, if the detonator fails to fire, the battery is discharged through a bleeder resistor. Sterilization is positive twenty-four hours after the destructor is released.

Safety features incorporated in the pistol prevent firing until the destructor is in at least ten feet of water and prevent arming until the arming wire is withdrawn at the time of release from the carrier.

Other objects and many of the attendant advantages of this invention will be readily appreciated as the same becomes better understood by reference to the following detailed description when considered in connection with the accompanying drawings wherein:

FIG. 1 is a view in vertical cross-section of the destructor showing the pistol in place;

FIG. 4 is a perspective view, partly in section, of the hydrostatic switch;

FIG. 7 is a front elevation of the clock delay mechanism;

FIG. 8 is a front elevation of the detonator;

FIG. 9 is a longitudinal section of the electrolytic sterilizing device; and

FIG. 10 is a wiring diagram suitable for use with the present invention.

Figure 2:
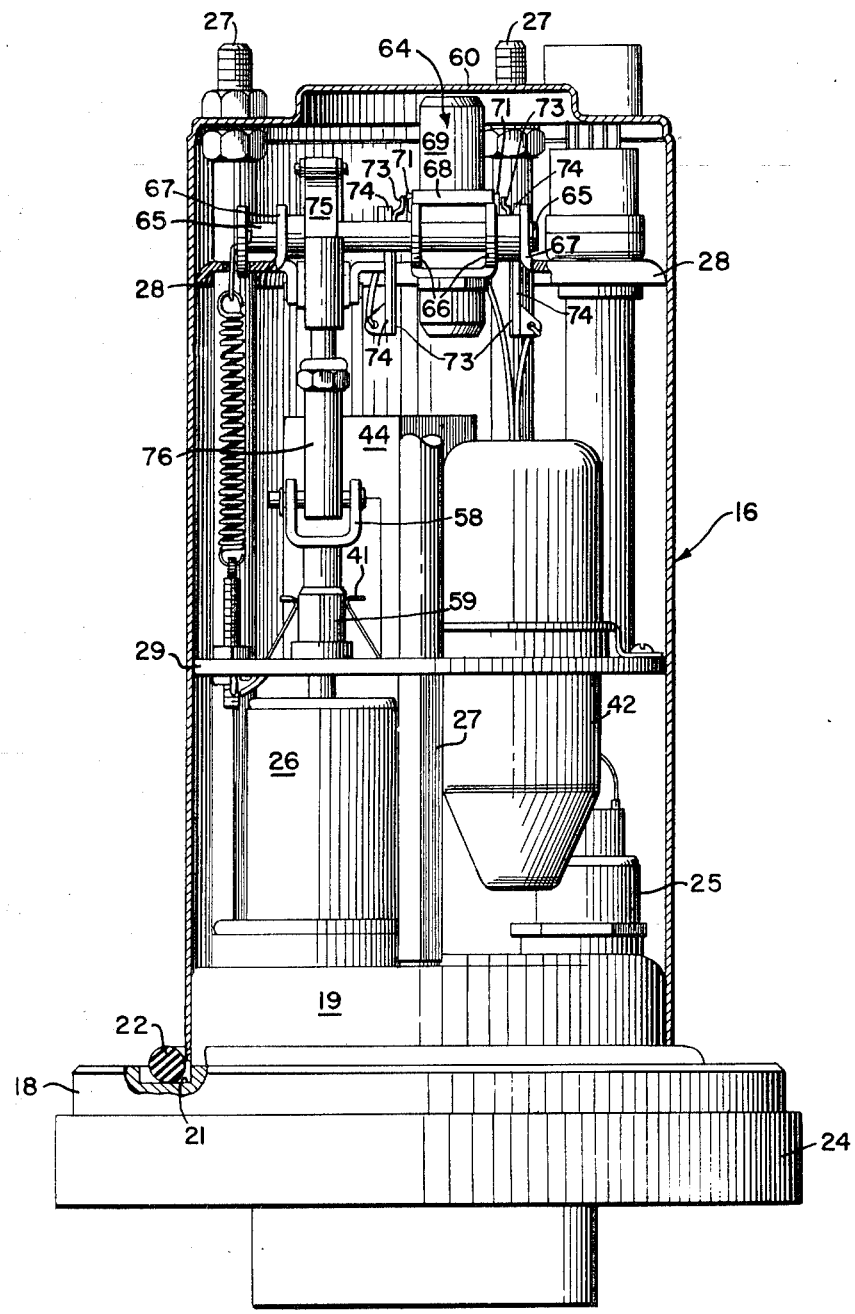
FIG. 2 is a front elevation of the pistol, partly in section.

Referring to the drawings wherein like parts are referred to by like numerals throughout the several views, FIGS. 1 and 2 illustrates a destructor 12 which comprises a cylindrical case having a central wall 13 in which is housed a battery 14, a connecting cable 15, a pistol 16, a booster charge 17, and a main charge 20. The pistol 16 is formed of numerous parts mounted on a brass body, the body having a rim portion 18, a central internally recessed portion 19 and an annular groove 21 located between the rim and central recessed portion. The rim is drilled at spaced intervals to receive bolts which secure the pistol to the destructor case while the annular groove is designed to seat an O-ring 22 which seals the unit when the pistol is secured to the destructor case to protect the mechanisms of the pistol.

The pistol consists chiefly of five component parts; a hydrostatic switch 25, an arming delay mechanism 26, a clock delay mechanism 44, a rotatable detonator gun assembly 64 and a sterilizing device 42. There is also a mechanical linkage 75 which connects the arming delay mechanism to the detonator gun assembly.

A base plate 24 is secured to the brass rim 18, holes in the plate being aligned with the holes of the rim, and protects the internally recessed central portion 19 of the brass body. Mounted on the central portion 19 of the body are the hydrostatic switch 25, which is exposed to the sea through the internally recessed central portion 19, and the arming delay mechanism 26. Also mounted on the central portion 19 are three posts 27 supporting a top metal deck 28 and an intermediate plastic (insulating material) deck 29.

The hydrostatic switch 25 (FIG. 4) is an in-and-out-of-water hydrostatically operated safety device which serves to close a break in the arming and firing circuit at a water depth of ten feet or more. It consists of a dashpot 31 and a spring loaded contact plate assembly. The dashpot comprises outboard chamber 32 and inboard chamber 33 filled with a silicone damping fluid. The chambers are separated by a wall 30 which is perforated to permit the damping fluid to pass from one chamber to the other. An inlet plug 34 admits water into contact with the outboard diaphragm 35, which forms the outer wall of the outboard chamber 32, the resulting pressure forcing the damping fluid into the inboard chamber 33. This action causes the inboard diaphragm 36 to move the contact plate 37 against the force of spring 40. When the plate 37 moves the carried contact disc 38 into contact with the pin 39, the circuit is completed.

Figure 5:
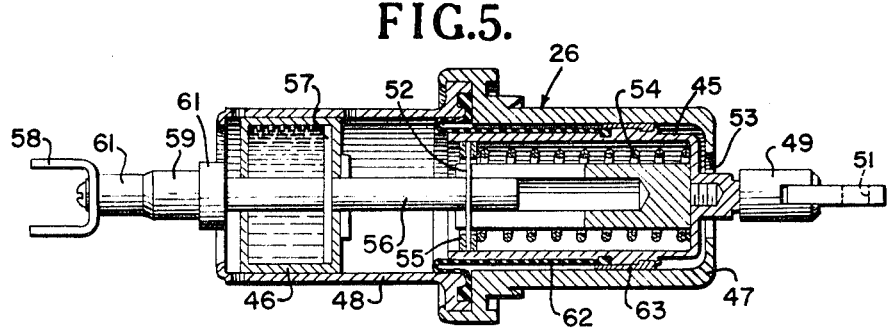
FIG. 5 is a longitudinal sectional view of the arming delay mechanism in an initial position.
Figure 6:
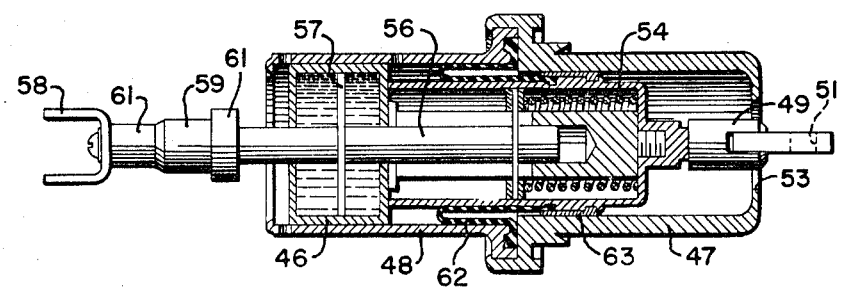
FIG. 6 is a similar view of the same mechanism in final position.

Referring to FIGS. 5 and 6, the arming delay mechanism 26 consists of a spring loaded piston 45 and a dashpot 46 secured in brass housings 47 and 48 respectively, which housings are crimped together. A safety latch 49 attached to the head end of the piston 45 is provided with a hole 51 for receiving an arming wire. The arming wire has not been shown in the carrier attached position but during the assembly of the explosive destructor, the outer portion of safety latch 49 is pivoted at a 90° angle to the piston axis and one end of an arming wire is threaded through a hole in the base plate 24 and through the hole 51 in the safety latch and the other end secured to the carrier to lock the piston 45 in the position illustrated in FIG. 5. As the destructor falls away from the carrier, the wire is withdrawn permitting the arming delay to operate. Water pressure, at a depth of at least ten feet acts on the piston 45, the water entering at opening 53, moving the piston towards the dashpot 46 to compress spring 54. The spring is held by a washer 52 and spring pin 55 to a piston rod 56 which carries the dashpot piston 57 and extends beyond the housing 48 terminating in a yoke 58. A rubber diaphragm 62 secured to piston 45 by the retaining ring 63 serves as a seal to prevent water entry into housing 48.

The dashpot 46 is filled with a silicone damping fluid which retards the action of the dashpot piston 57. Movement of the piston 45 is taken up by the compression of the spring 54 and is slowly transferred to the dashpot piston 57, whose movement permits the rod 56 and its yoke to extrude farther from the housing 48 as illustrated in FIG. 6. Secured to piston rod 56 is a plastic insulating sleeve 61 which carries yoke 58. A metallic contact bushing 59 circumscribes the plastic sleeve 61 and the bushing therefore is insulated from yoke 58 and brass housing 48. Movement of rod 56 causes the contact bushing 59 to close the switch 41 which is mounted on plastic deck 29 as illustrated in FIG. 2 which switch closing places the sterilizing device 42 in series with the timing resistor 45.

Figure 3:
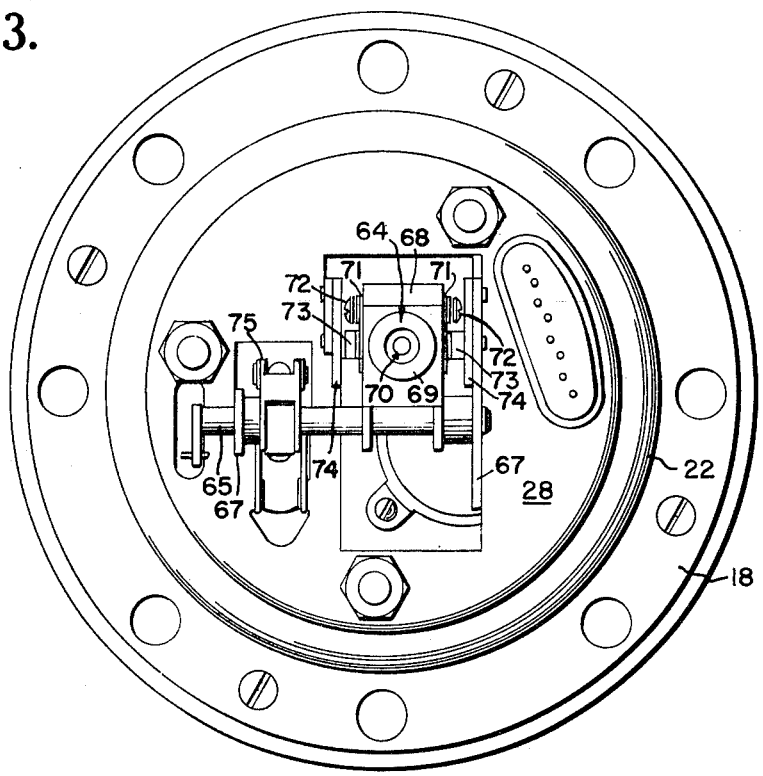
FIG. 3 is a top plan of the pistol.

Referring now to FIGS. 2 and 3, the detonator gun 64 is fixed by arms 66 on an axle 65 which is mounted for rotation in ears 67 upturned from the top metal deck 28. The detonator gun comprises the mount 68 and the barrel 69, the mount being secured to the arms 66 and supporting the barrel 68. The mount also carries, on opposite sides, metal strips 71 having screws 72 for connecting the wires of the detonator 70 to the strips 71, the connecting wires having not been shown for the sake of simplicity. Spaced spring arm contacts 73 carried by the metal deck 28 and insulated therefrom by insulator strips 74 are each connected to one of the metal strips 71 when the detonator gun is rotated to the armed position as illustrated in FIGS. 2 and 3. The pivotal movement of the detonator gun is caused by the rotation of the axle 65 by means of linkage 75. The yoke 58 is connected through the adjustable linkage assembly 76 and mechanical linkage 75 to the axle 65 so that the linear motion of the yoke 58, as caused by operation of the arming delay mechanism 26 as hereinbefore described, is transferred to annular motion of the axle to move the detonator gun into firing position with the muzzle of the barrel against a weakened portion 60 of the pistol, which weaker portion is in contact with a booster charge 17 as best illustrated in FIG. 1. It should be understood that when the pistol is in the unarmed condition, i.e. when the arming delay mechanism is in the condition illustrated in FIG. 5, the axle 65 is rotated 180° from the position illustrated in FIGS. 2 and 3 placing the detonator gun on the opposite side of the axle from that illustrated with the detonator 70 facing away from the booster charge 17 adjacent the weakened portion 60.

Movement of the arming delay mechanism 26 rotates the axle 65 through linkage 75 as hereinbefore described. An actuator rod 79 connected to the clock delay mechanism 44 as seen in FIG. 7 is also connected to the linkage 75 in such a manner so as to move the actuator rod 79 in the same direction as yoke 58. The actuator rod 79 is located directly behind the adjustable linkage assembly 76 and does therefore not appear in FIGS. 2 and 3. Movement of the actuator rod 79 upwardly, as viewed in FIG. 7, stresses a pair of constant force springs 77. Each of these springs is connected to a separate clock delay mechanism, which may be set to operate for a period of from nine to thirty minutes. The clock delay consists essentially of two independent clock mechanisms electrically and mechanically connected in parallel to minimize the possiblity of failure. The operation and construction of each of these clock delay mechanisms is coincidental and similar and only one is herein described. The end of the spring 77 is connected to an arm 78 and constantly urges the arm in a counter-clockwise direction (FIG. 7) to eventually bring arm 78 into engagement with a wire 81 to complete an electrical circuit and fire the detonator 70. The wire 81 extends across the clock delay mechanism 44 perpendicular to the direction of travel of arm 78 such that when either or both arms 78 reach the position illustrated in phantom in FIG. 7, contact is made between arm 78 and wire 81 to complete the electrical firing circuit. Movement of the arm is retarded by a clock movement train and escapement for a period of from 9–30 minutes.

The detonator 70 (FIG. 8) is the initiating charge in the explosive train. It comprises a metallic cylinder 82 containing an explosive charge. Two insulated leads 83 are sealed into the detonator and serve to connect the detonator between the metal strips 71 by the screws 72 to complete the firing circuit through the detonator.

The sterilizing device 42 (FIG. 9) is a timing electrolytic element which is used to limit the armed life of the destructor to a predetermned period of time.

As shown in FIG. 9, the timing cell comprises a brass cell housing 84 having a lead deposited inner wall serving as a cathode, an electrolyte 85 (a lead fluoborate solution sealed within the cell housing 84 by rubber gaskets 86) and a silver anode wire 89. The housing is provided with a plastic end cap 87 held in place by a retaining ring 88 and supporting the silver anode wire 89. The wire extends through the rubber diaphragms into the electrolyte from which it is protected by a polyethylene sleeve 90 except at a central portion, which central portion is covered by a lead pellet 91.

The end of the cell housing 84 opposite the plastic end cap 87 is closed by a cap 92 formed with a hub 93 and housing a coil spring 94 and plunger 95. The end of the anode wire 89 is secured in plunger 95 which is urged by the spring away from the electrolyte, exerting a tensile stress on the silver anode wire. Attached to the extreme end of the cell housing, beyond the cap 92, is a plastic contact housing 96. Carried by the housing are three contacts 97, only one of which has been illustrated, forming a switch which when closed places the battery 14 in series with the detonator and a low resistance, for example as 1 ohm, timing resistor 43 which will drain the battery should the detonator fail to ignite as will hereinafter become more readily apparent as the description proceeds.

The electrolytic timing element or sterilizing device is initiated by the closing of switch 41 by the arming delay 26 and after a 90±30 minute time cycle the action within the cell causes the lead pellet 91 to plate away onto the cell wall thus exposing the middle portion of the silver anode wire which is not protected by the polyethylene sleeve 90 to the electrolyte. Further cell action deplates the silver at the center of the wire, weakening the wire until the force of the coil spring 94 breaks the wire permitting the plunger 95 to close the switch composed of contacts 97, resulting in a direct connection of the battery 14 with the detonator 70. If both switches, the firing switch operated by the clock delay mechanism 44 and the switch having contacts 97, fail to ignite the detonator 70, the sterilizing action is initiated which after a suitable period, such as twenty-four hours, renders the destructor comparatively harmless.

The pistol and destructor operate generally as follows: at a depth of at least ten feet, switch 25 (FIG. 10) formed by the contact disc 38 and pin 39 in the hydrostatic switch of FIG. 4 closes under the action of hydrostatic pressure to bring the battery 14 into the circuit. When the destructor is released from the carrier, the arming wire is withdrawn from the safety latch 49 and the arming delay mechanism 26 of FIGS. 5 and 6 operates under the hydrostatic pressure. The mechanical linkage 75 starts to rotate the detonator gun assembly 64 and starts the clock delay mechanism 44. At a point in its travel, the arming delay mechanism 26 moves the bushing 59 across the contacts of switch 41 which initiates the action of the sterilizer 42 by connecting the sterilizer across the battery 14 through a current limiting resistor. As the arming delay mechanism continues to operate, the detonator gun 64 continues to rotate until the barrel 69 containing detonator 70 is pointed toward the weakened portion 60 adjacent booster charge 17 and the contact between the metal strips 71 to which the detonator 70 is connected and the spring arm contacts 73 is complete. This closes switch 71 in FIG. 10 to place the detonator 70 in the firing circuit. After a period of between four and thirty minutes after the release of the destructor from the carrier, the clock delay mechanism 44 completes its cycle at the end of which the arms 78 make contact with the wire 81 to complete the firing circuit, this contact being designated in the circuit diagram of FIG. 10 as parallel connected switch 99. Closure of either contact on switch 99 completes the firing circuit thereby firing the detonator. If the detonator fails to fire, the switch contacts 97 and 98 closed by the operation of the plunger 95 in the sterilizer 42 connects the battery 14 directly to the detonator 70 shunting the clock delay mechanism contacts 99 and if the detonator again fails to fire the battery is bled through the resistor 43.

Obviously many modifications and variations of the present invention are possible in the light of the above teachings. It is therefore to be understood, that within the scope of the appended claims, the invention may be practiced otherwise than as specifically described.

What is claimed and desired to be secured by Letters Patent of the United States is:

1. The combination of a destructor carrying an explosive charge with a pistol for igniting said charge, said pistol comprising a hydrostatically operated switch requiring a water depth of at least ten feet to operate the switch, a battery, said hydrostatic switch connected in electrical series circuit with said battery, a hydrostatically operated arming delay mechanism, a mechanical linkage connected to and driven by said arming delay mechanism, electric contacts connected in electrical series circuit with said hydrostatically operated switch and said battery, said electric switch closed by the operation of said arming delay mechanism, a sterilizer, means connecting said sterilizer and said battery in electrical series circuit through said hydrostatic switch and said electric contacts, a detonator gun pivotally mounted for partial roatation and connected to said mechanical linkage to be moved by said mechanical linkage from an unarmed position to an armed position, a detonator carried by said detonator gun, a clock delay mechanism actuated by said arming delay mechanism through said mechanical linkage simultaneously with the rotation of said detonator gun, a detonator firing switch actuated by said clock delay mechanism after said detonator gun is rotated into the armed position, and means connecting said detonator in electrical series circuit with said battery through said hydrostatically operated switch and said detonator firing switch.

2. A combination as claimed in claim 1 wherein the hydrostatic switch comprises a dashpot filled with a damping fluid, a spring loaded contact plate movable by said dashpot, and a contact pin spaced from the contact plate, said dashpot when exposed to a water depth of at least ten feet moves said contact plate into engagement with said contact pin.

3. A combination as claimed in claim 2 wherein the dashpot of the hydrostatic switch comprises a pair of chambers filled with a silicone damping fluid, a perforated wall separating said chambers and restricting the flow of damping fluid from one chamber to the other, one of said chambers having an outboard diaphragm exposed to outside pressure, the other of said chambers having an inboard diaphragm moving in response to volumetric changes in said chamber in accordance with the changes of pressure on said outboard diaphragm and as transmitted by said damping fluid.

4. A combination as claimed in claim 1 wherein the arming delay mechanism comprises a housing, a spring loaded piston exposed to pressure outside of said housing, a piston rod connected to said piston and extending beyond said housing, a yoke carried by said piston rod at one end and connected to said mechanical linkage, a dashpot within the housing and actuated by the movement of said piston rod, a safety latch carried by the head end of the piston, an arming wire passing through said safety latch to prevent movement of the piston, said arming wire being withdrawn on release of the destructor from the carrier.

5. A combination as claimed in claim 4 wherein the piston rod of the arming delay mechanism moves between a pair of contacts, and a metallic bushing carried by and insulated from said piston rod for connecting said contacts upon predetermined travel of said piston rod.

6. A combination according to claim 4 including a linkage mechanism connected to the yoke of the piston rod and to said clock delay mechanism and to said detonator gun whereby movement of the piston rod of the arming delay mechanism will rotate the detonator gun and start the clock delay mechanism through said linkage.

7. A combination as claimed in claim 1 wherein the clock delay mechanism comprises a pair of identical spring operated mechanical clock escapement mechanisms connected electrically and mechanically in parallel.

8. A combination according to claim 7 including in the clock delay mechanism a pair of normally open clock switches closed by said clock delay mechanisms to fire said detonator.

9. A combination according to claim 1 wherein the detonator gun comprises a barrel and a mount supporting said barrel for partial rotation, a detonator housed in said barrel, leads sealed into said detonator, contact plates carried on each side of said mount, each of said leads being connected to one of said plates, the rotation of the gun mount moving said plates into the circuit connected with said battery to arm said detonator.

10. A combination according to claim 1 wherein the sterilizer comprises an electrolytic cell, a cell casing, contacts carried by said cell casing and adapted to be closed after the operation of said cell for a predetermined time, the closing of said contacts establishing a circuit shunting said detonator firing switch including the battery and the detonator to fire said detonator.

11. A combination according to claim 10 including a resistor connected in electrical series circuit with said battery, said hydrostatically operated switch and said detonator to bleed said battery and render the destructor incapable of being exploded after a time interval.

12. An arming and firing circuit for an underwater destructor comprising a power source, a detonator, first and second electrical switch means, hydrostatically actuated means connected to said first switch means for closing said first switch means when said destructor reaches a predetermined depth of submergence, hydrostatically actuated time delay means connected to said second switch means for closing said second switch means a predetermined time after said destructor reaches a predetermined depth of submergence, mechanical time delay means connected to said hydrostatically actuated time delay means and actuated thereby, third electrical switch means integrally formed as a part of said mechanical time delay means, said mechanical time delay means closing said third electrical switch means a predetermined time after actuation of said hydrostatically actuated time delay means, and means connecting said power source, said detonator and said first, second and third switch means in electrical series circuit whereby said detonator is exploded when said third switch means is closed by said mechanical time delay means.

13. The arming and firing circuit of claim 12 further comprising a time delay electrolytic sterilization device, fourth switch means connected to said hydrostatically actuated time delay means and closed thereby a predetermined time after said destructor reaches a predetermined depth of submergence, and means connecting said fourth switch means and said electrolytic sterilization device in electrical series circuit with said power source.

14. The arming and firing circuit of claim 13 further including fifth switch means connected in electrical parallel circuit with said third switch means, said fifth switch means connected to said sterilization device and closed thereby a predetermined time after closing of said fourth switch means whereby said third switch means is shunted and said detonator is connected to said power source through said fifth switch means to explode said detonator should said third switch means fail to operate.

15. The arming and firing circuit of claim 14 further including sixth switch means connected to said sterilization device and closed thereby, means connecting said sixth switch means in parallel with said second switch means and said detonator, means connecting said first, fifth and sixth switch means in electrical series circuit with said power source whereby said detonator is shunted by said sixth switch means and said power source is drained of its energy.

16. A pistol for initiating an underwater destructor charge comprising a casing, a hydrostatically electrical switch mounted in said casing and exposed to the exterior environment of said casing, a detonator mounted for rotation in said casing and moveable from a safe position to an armed position, a hydrostatically operated drive means mounted in said casing and exposed to the exterior environment thereof, linkage means connecting said hydrostatically operated drive means and said detonator for rotating said detonator from said safe position to said armed position a predetermined time period after said pistol reaches a predetermined depth of submergence, first electrical switch means mounted in said casing and closed by the rotation of said detonator from the safe position to the armed position, mechanical time delay means mounted in said casing and connected to said linkage means for actuation by said hydrostatically operated drive means, second electrical switch means integrally formed in said mechanical time delay means, said second electrical switch means closing a predetermined time after actuation of said mechanical time delay means, a battery, circuit means connecting said battery, said hydrostatically operated electrical switch, said first and said second electrical switch means and said detonator in electrical series circuit whereby when said second electrical switch means closes said detonator is initiated.

17. The pistol of claim 16 further including an electrolytic sterilization device mounted in said casing, said sterilization device having a plurality of electrical contacts closed, a predetermined time after energization of said sterilization device, means connecting said sterilization device to said battery to energize said sterilization device when said detonator has been rotated to the armed position, circuit means connecting a first pair of said contacts in parallel electric circuit with said second electrical switch means for shunting said second electrical switch means to initiate said detonator upon failure of said mechanical time delay means to operate.

18. The pistol of claim 17 further including means connecting a second pair of said plurality of electrical contacts in parallel electric circuit with said detonator and in series electric circuit with said first pair of contacts for draining the energy from said battery.

19. The pistol of claim 16 further including an electrolytic sterilization device mounted in said casing, a plurality of electrical contacts closed by the operation of said sterilization device, third electrical switch means mounted in said casing, said third electrical switch means being closed by said linkage means as said hydrostatically operated time delay means rotates said detonator from said safe position to said armed position, means connecting said sterilization device, said battery, said hydrostatically operated electrical switch means, and said third switch means in electrical series circuit such that said sterilization device is energized by the closing of both said hydrostatically operated switch means and said third switch means, said sterilization device operating to close said plurality of contacts a predetermined time period after energization, circuit means connecting a first pair of said plurality of contacts in parallel electric circuit with said second electrical switch means for shunting said second electrical switch means to initiate said detonator if said mechanical time delay means fails to operate, and means connecting a second pair of said plurality of electrical contacts in parallel electric circuit with said detonator and in series electric circuit with said first pair for draining the energy from said battery.

20. The combination of a destructor carrying an explosive with a pistol for igniting the explosive, said pistol comprising a hydrostatically operated switch, an arming delay mechanism operated by water pressure, a detonator gun mounted for partial rotation and carrying a detonator, a linkage mechanism actuated by the arming delay mechanism connecting said arming delay mechanism with said detonator gun to move said detonator gun from an initial safe position to an armed position, a clock delay mechanism actuated by said linkage mechanism, a switch closed by said clock delay mechanism to fire said detonator, a battery, means connecting said hydrostatic switch, said clock delay switch and said detonator in electrical series circuit, and a sterilizing device connected in electrical series circuit with said hydrostatic switch and said battery, said sterilizer, upon failure of said detonator to fire, rendering the destructor incapable of firing after a predetermined time period.

21. A combination according to claim 20 including a resistor in circuit with said sterilizer and said battery to bleed said battery.

References Cited

UNITED STATES PATENTS

| | | | |
|---|---|---|---|
| 2,526,670 | 10/1950 | Kissinger et al. | 102—16 |
| 2,827,850 | 3/1958 | Muzzey | 102—16 |
| 2,943,569 | 7/1960 | Wolfe | 102—16 |
| 2,960,030 | 11/1960 | Semon | 102—16 |

BENJAMIN A. BORCHELT, Primary Examiner

J. M. HANLEY, Assistant Examiner

U.S. Cl. X.R.

102—70.2 R